Sept. 29, 1936.  C. F. GREINER  2,055,974
ROAD ROLLER
Filed Oct. 3, 1935
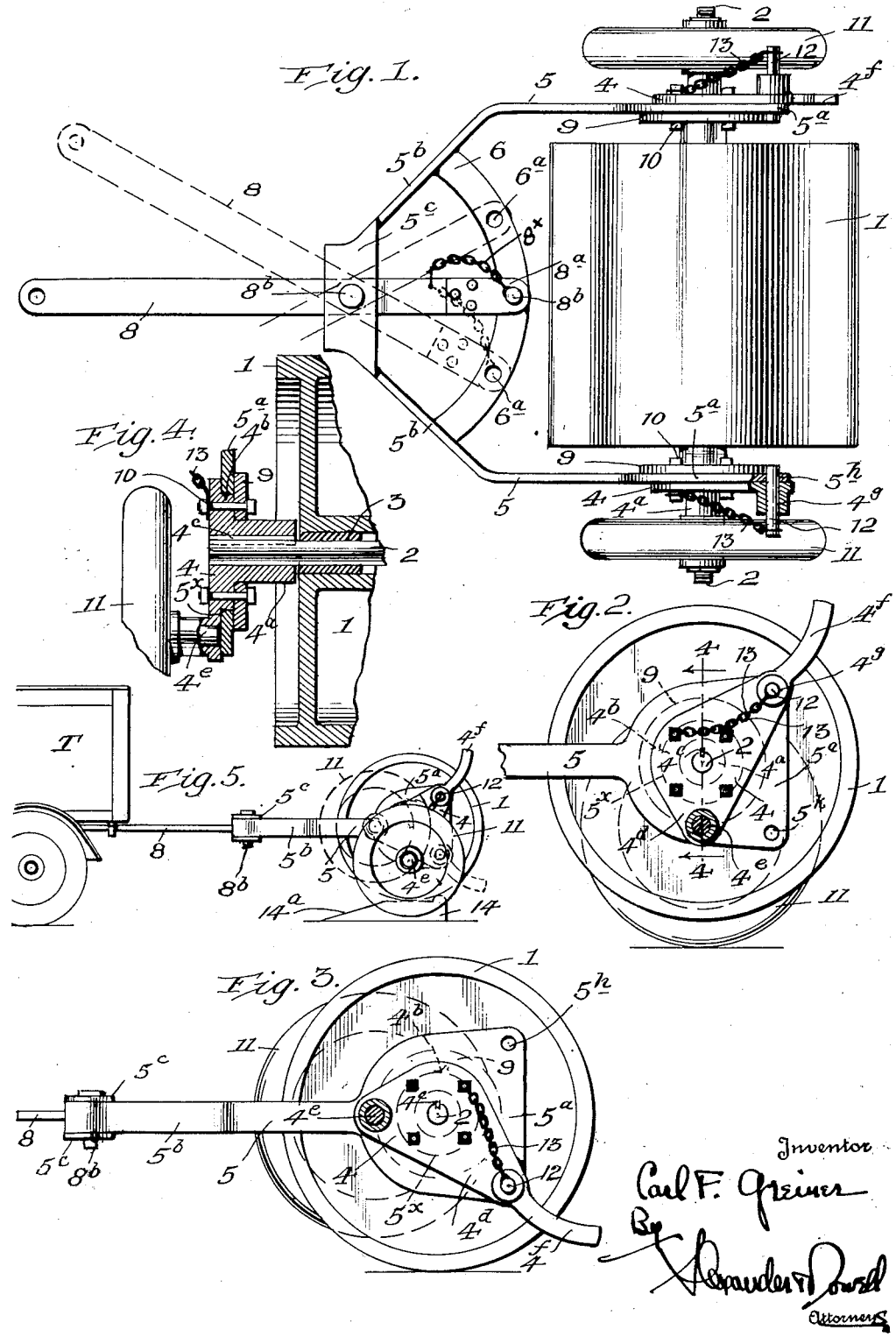

Patented Sept. 29, 1936

2,055,974

UNITED STATES PATENT OFFICE 2,055,974

ROAD ROLLER

Carl F. Greiner, Springfield, Ohio, assignor to The Buffalo-Springfield Roller Co., Springfield, Ohio, a corporation of Ohio Application October 3, 1935, Serial No. 43,422

9 Claims. (Cl. 94—50)

This invention is a novel improvement in cylindrical gravity rollers commonly used for rolling and compacting the surfaces of highways and for other analogous purposes, and the principal object of the present invention is to provide a gravity roller of the above type with transporting wheels having pneumatic tires enabling the ground roller to be transported at relatively high speeds over road surfaces, said wheels being eccentrically mounted with respect to the shaft of the ground roller, and means being provided for selectively bringing either the ground roller or the transporting wheels into contact with the road or other surface without necessitating inverting the frame of the roller in order to accomplish this purpose.

Such gravity rollers usually consist of a trailer frame carrying the journals for the shaft of the ground roller, said frame having at one end a tongue for attachment to the rear end of a truck or other towing vehicle for imparting motion to the gravity roller when in the act of rolling the desired surface and when being transported over a road surface to the place of use. During the act of transportation the ground roller is raised above the road surface, and supported entirely upon the transporting wheels; and in such position of parts the gravity roller may be drawn by the truck or towing vehicle for relatively long distances over ordinary road surfaces much more rapidly than would be the case if the ground roller itself were contacting with the road surface.

Heretofore such gravity rollers have been provided in which the wheels were fixedly mounted eccentrically of the ground roller shaft, so that in one position of the gravity roller the wheels would contact with the road, and in inverted position the ground roller would engage the road; and hence after the gravity roller had been transported to the place of use it was necessary first to uncouple the tongue from the truck or towing vehicle, then to invert the frame of the gravity roller so that the ground roller per se would be contacting with the road, then to turn the truck around on the road and bring same adjacent the inverted position of the tongue; then to again couple the tongue to the truck, and finally again turn the truck and gravity roller around on the road surface before the operation of rolling could proceed.

Where the ground rollers weigh several tons, more or less, it is in fact difficult to turn the same around sharply on a road surface; and hence such procedure necessarily involved considerable time and effort, as well as much unnecessary handling of parts.

In my invention the gravity roller need not at any time be uncoupled from the truck or towing vehicle, since the transporting wheels in my construction are adjustable eccentrically of the ground roller shaft so that same may be raised and lowered with respect thereto.

I will explain the invention with reference to the accompanying drawing which illustrates one practical embodiment thereof to enable others familiar with the art to adopt and use the same; and will summarize in the claims the novel features of construction, and novel combinations of parts, for which protection is desired.

In said drawing:—

Fig. 1 is a top plan view of my gravity roller showing the wheels in position for transporting the ground roller above the road surface.

Fig. 2 is a partial side elevation of the gravity roller shown in Fig. 1, the wheel at the near end of the roller being removed to show more clearly the adjustable eccentric mounting of the stub axles of the wheels.

Fig. 3 is a view similar to Fig. 2 but showing the wheels in raised position and the ground roller in contact with the road surface, illustrating the position of parts when actually rolling the surface of a road or the like.

Fig. 4 is an enlarged partial vertical section on the line 4—4, Fig. 2; and

Fig. 5 is a diagrammatic view showing the gravity roller coupled to the rear end of a truck, and illustrating the use of the block when proceeding to raise or lower the wheels with respect to the ground roller.

As shown, my gravity roller comprises a cylindrical ground roller 1 of required weight and size mounted upon a shaft 2 journaled in bushings 3 (Fig. 4) in the bore of the ground roller. A trailer frame 5 embraces the ground roller 1, the sides of the frame having enlarged substantially rectangular head plates 5a disposed opposite the ends of the shaft 2 as illustrated in Figs. 2 and 3. The frame 5 is preferably substantially U-shaped, but might be of rectangular or other shape and might if desired extend entirely around the ground roller 1.

The front corners of trailer frame 5 are preferably deflected inwardly as at 5b and are secured together by upper and lower plates 5c. A quadrant plate 6 spans the deflected portions 5b of the frame, and the plate 6 is provided with three or more holes 6a. Tongue 8 is pivoted on a pin 8b extending through the plates 5c and the bifurcated inner end 8a of the tongue slides upon the quadrant plate 6 and is provided with holes adapted to register with any of the holes 6a in quadrant plate 6 when the tongue is swung around into the various positions shown in full and dotted lines in Fig. 1, and a pin 8b may be passed through the registering holes in the inner end 8a of the tongue and the hole 6a in the quadrant plate 6, to lock the tongue in desired position. A chain 8x is preferably provided for pin 8b to prevent loss of same. In the position shown in full lines in Fig. 1, since tongue 8 is in axial alignment with the frame 5, the ground roller will trail directly behind the truck or drawing vehicle T (Fig. 5); but when tongue 8 is in any of the dotted-line positions (Fig. 1), the gravity roller will trail truck T but its axis will be offset from the axis of the truck, such arrangement being particularly adapted for rolling the soft shoulders of a road where the truck T moves along upon the edge of the hard surface thereof.

At each end of shaft 2 is a substantially triangular plate 4 having a stepped hub 4a, 4b locked to shaft 2 preferably by keys 4c as illustrated in Fig. 4, so that plates 4 will rotate in unison with shaft 2, the plates 4 at each end of the shaft being symmetrical. The cylindrical intermediate step 4b of each plate 4 is adapted to snugly fit a large circular bore 5x (Fig. 4) in the enlarged head plate 5a of the frame 5 whereby the plates 4 and shaft 2 are journaled in frame 5. The stepped portion 4b of each plate 4 is maintained in the bore 5x of the head plate 5a by means of an annular plate 9 which is bolted or otherwise secured to the hub of plate 4 preferably by means of bolts 10 extending through the plates 4 and 9 within the pitch circle of the bore 5x. Thus the hubs of plates 4 are journaled in the head plates 5a of frame 5 and the plates 4 (and shaft 2) may rotate with respect to the heads 5a.

At one corner 4d of each plate 4 is a stub-shaft 4e upon which is journaled a transporting wheel 11, said wheel being thus eccentrically disposed with respect to the shaft 2 as clearly indicated in Fig. 2. Preferably each wheel 11 is provided with a heavy pneumatic tire as shown, enabling the gravity roller to be transported over a road surface at relatively high speeds. The opposite corner of each plate 4 is extended to form a handle 4f projecting considerably beyond the periphery of the ground roller 1 so as to enable the plates 4 to be shifted readily in adjusting the wheels 11, and in each handle 4f adjacent its end is a hole 4g adapted to register with a hole 5h in the upper end of head 5a to receive a pin 12 which locks the plate 4 to head 5a in such position that the stub-shaft 4e is directly under the shaft 2, in which position the wheels 11 will maintain the ground roller 1 in elevated position with respect to the road surface (as clearly indicated in Fig. 2) with a minimum of strain on the keys 4c. Preferably a chain 13 is provided for the pin 12 to prevent loss of same.

When it is desired to bring the ground roller 1 into engagement with the road surface, wheels 11 must be elevated as shown in Fig. 3. In this position of parts the pins 12 have been removed from the holes 5h in the upper ends of heads 5a and the handles 4f depressed to rotate the plates 4 so as to elevate the stub-shafts 4e into such position that the wheels 11 are raised above the lower periphery of the ground roller. Owing to the relatively long length of handles 4f the operation of raising wheels 11 may be performed with a minimum of effort the handles 4f presenting ample leverage for this purpose. The pins 12 in such position are then passed through the holes 4g in plate 4 and through the registering holes 5k (Fig. 2) in the lower ends of the head plates 5a to lock the wheels 11 in raised position.

The above construction obviates the necessity of having to invert the frame 5 of the roller to bring the ground roller 1 or wheels 11 into contact with the road surface; and the transposition of parts may be accomplished without having to uncouple the tongue 8 from the truck T, the transposition being effected by use of a block 14 which may conveniently be carried when not in use upon the front end of frame 5, and if desired same may be locked thereto in any desired manner.

In operation, after the gravity roller has been drawn over the road surface supported upon wheels 11 to the desired place of use, the roller is backed by the truck T upon a beveled block 14 (Fig. 5) of slightly greater height than the distance between the lower peripheries of the wheels 11 and that of the ground roller 1 when the wheels are in lowered position (Fig. 2). When the gravity roller is thus backed upon block 14, the ground roller 1 will ride up the beveled portion 14a of the block, and the weight of the roller will be carried entirely by said block, the weight being consequently removed from the wheels 11. Pins 12 may then be readily removed from the registering bores 4g, 5h and the long handles 4f depressed from the full-line position shown in Fig. 5 to the dotted-line position, and the pins 12 thereupon inserted in the registering holes 4g, 5k, whereby wheels 11 will be maintained in elevated position with respect to the lower periphery of the ground roller. By moving the truck T forwardly the ground roller 1 will pass down the inclined surface 14a of the block and will directly engage the road surface; and the transposition of parts will have been effected without inverting the frame 5 of the roller and without disconnecting the tongue from the truck T. After the rolling has been completed, the gravity roller may then again be backed by the truck T upon the block 14 and the handles 4f swung from the lower dotted-line position shown in Fig. 5 to the full-line position shown therein, and the pins 12 re-inserted in the registering holes 4g, 5h; and upon forward movement of truck T the wheels 11 will engage the road surface, maintaining the ground roller 1 in elevated position, and the gravity roller may then be drawn at relatively high speed back to its usual place of storage.

The above described construction provides a gravity roller which is simple, in construction and operation, is durable and efficient; and one that is a decided improvement over gravity rollers of the type heretofore used.

I claim:

1. A gravity roller comprising a trailer frame; a relatively heavy single roller journaled in the frame; members movably mounted on the frame adjacent the ends of the ground roller; wheels journaled on said members offset from the axis of the ground roller and adapted in one position of the members to support the ground roller; said ground roller being adapted to be temporarily supported so as to raise the wheels above the surface of the ground; and means when the ground roller is thus supported for selectively bringing either the ground roller or wheels into position for engagement with the ground surface when the ground roller is subsequently unsupported.

2. In a gravity roller as set forth in claim 1; said frame having bores; and said members comprising plates having hubs journaled in the bores; stub-shafts for the wheels carried by the plates; and means for locking the members to the frame.

3. In a gravity roller as set forth in claim 1; said frame having bores; and said members comprising plates having hubs extending from one face entering the bores; annular locking plates mounted on the hubs for maintaining the hubs in the bores; stub-shafts for the wheels carried by the plates, and means for locking the members to the frame.

4. In a gravity roller as set forth in claim 1; said selective means comprising handles for moving the members; and means for locking the members in adjusted positions to the frame.

5. In a gravity roller as set forth in claim 1; said selective means comprising handles for moving the members; and pins adapted to enter registering perforations in the members and frame when the wheels are in adjusted positions.

6. In a gravity roller as set forth in claim 1; said selective means comprising handles for moving the members; and pins adapted to enter registering perforations in the members and frame when the wheels are substantially directly under the axis of the ground roller, and to enter other registering perforations in the members and frame when the wheels are raised with respect to the ground roller.

7. In a gravity roller as set forth in claim 1; said members being pivoted on the frame at each end of the ground roller; and means whereby said members will pivot in unison.

8. In a gravity roller as set forth in claim 1; said frame having bores; and said members comprising plates having hubs extending from one face entering the bores; annular locking plates mounted on the hubs for maintaining the hubs in the bores; stub-shafts for the wheels carried by the plates, means for locking the members to the frame; and a shaft for the ground roller extending into said plates and fixedly secured thereto whereby the members will pivot in unison.

9. In a gravity roller as set forth in claim 1; said frame having bores; and said members comprising plates having hubs journaled in the bores, stub-shafts for the wheels carried by the plates, means for locking the members to the frame; and means for pivoting the members in unison comprising a shaft for the ground roller extending into said hubs and fixedly secured thereto.

CARL F. GREINER.